Feb. 15, 1966 D. R. BOYD ETAL 3,235,476

METHOD OF PRODUCING OHMIC CONTACTS ON SEMICONDUCTORS

Original Filed April 18, 1960

INVENTORS
David R. Boyd,
Yro T. Sihvonen, &
BY Calvin D. Woelke
E. N. Shampo
ATTORNEY United States Patent Office 3,235,476

Patented Feb. 15, 1966

3,235,476

METHOD OF PRODUCING OHMIC CONTACTS ON SEMICONDUCTORS

David R. Boyd, Royal Oak, Yro T. Sihvonen, Birmingham, and Calvin D. Woelke, Detroit, Mich., assignors to General Motors Corporation, Detroit, Mich., a corporation of Delaware Original application Apr. 18, 1960, Ser. No. 23,038, now Patent No. 3,121,852, dated Feb. 18, 1964. Divided and this application Feb. 21, 1963, Ser. No. 266,124
4 Claims. (Cl. 204—192)

This application is a division of our copending United States patent application Serial No. 23,038, Boyd et al., now Patent No. 3,121,852, entitled "Ohmic Contacts on Semiconductors," which was filed April 18, 1960.

This invention relates to semiconductor devices. More particularly the invention pertains to transparent ohmic contacts on semiconductor devices, as well as to the method and apparatus by which such contacts are formed.

Certain semiconductors, such as cadmium sulfide, exhibit photo-conducting properties which can be utilized for a variety of purposes. However, use of such a semiconductor heretofore has been restricted because it was not possible to realize the fullest potential of the advantages obtainable therewith. A most important factor which impeded the full realization of these benefits was the impossibility of making a suitable, low resistance, transparent ohmic contact with the semiconductor crystal.

It is well recognized that the resistance of an electrical contact is decreased by increasing the contact area. For this reason low resistance electrical connections generally involve initially attaching an electrical contact to a comparatively large surface area on the semiconductor and thereafter soldering an electrical lead to the contact. The electrical contact attached to the semiconductor can be a rectifying contact or an ohmic contact. It is toward this latter type of contact that our invention is directed.

Suitable low resistance ohmic contacts on semiconductors must not only involve the largest feasible contact area but the contact must have an intimate association with the semiconductor. Although various means can be used to attach an electrical contact to the surface of a semiconductor not all of these means provide the intimate association between contact and semiconductor that is required for lowest electrical impedance. The most suitable ohmic contacts are opaque and impenetrable by electromagnetic means such as visible and ultraviolet light. However, a comparatively large opaque contact on the surface of the crystal simultaneously inhibits irradiation of the semiconductor. Thus, to utilize the photoconducting properties of such a semiconductor it was heretofore necessary to sacrifice lowest possible resistance by using comparatively small contacts. A compromise between lowest impedence and maximum generation of photocurrents had to be made.

Our invention eliminates this compromise by providing a conductive transparent film which can be intimately secured to a semiconductor. Our invention can be used to make a semiconductor ohmic contact which permits maximum generation of photocurrents with minimum impedence to the flow of electrons therethrough. Our invention provides both a method and apparatus for making transparent ohmic contacts on such semiconductors.

Other objects, features and advantages of this invention will become more apparent from the following description of preferred embodiments thereof and from the drawing, in which.

Our invention comprehends sputtering a tin-indium alloy onto the surface of the semiconductor in an oxygen atmosphere to form a transparent electrically conductive film thereon which functions as an ohmic contact. The method by which the transparent coating is applied to the semiconductor can more expeditiously be described in connection with the apparatus used. For this reason a prior description of the apparatus would be fruitful and reference is herewith made to FIGURE 1.

Figure 1:
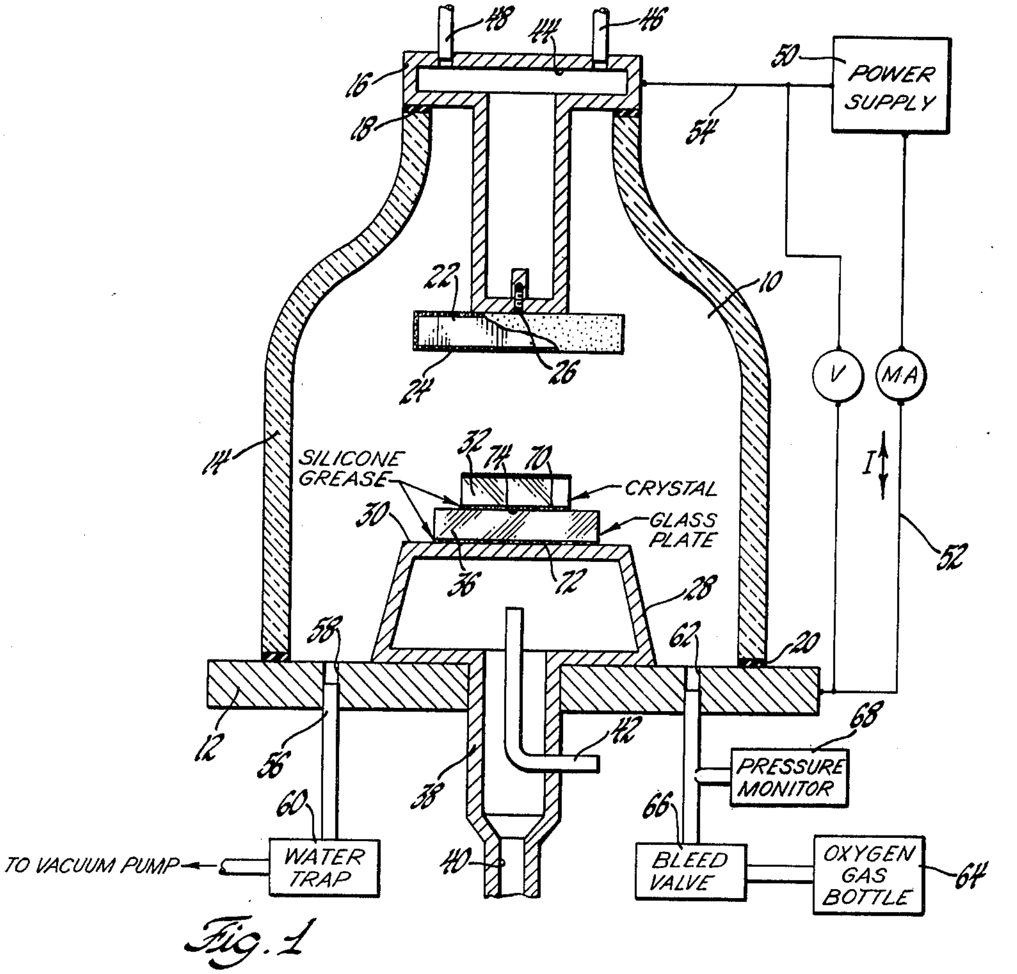
FIGURE 1 is a schematic view showing an apparatus contemplated by the invention as useful in forming transparent ohmic contacts on a semiconductor.

The apparatus in FIGURE 1 has a closed chamber 10 which is formed by a metal base plate 12, a glass housing 14 and an upper electrode support 16. Resilient seal members 18 and 20, respectively, are disposed between the base plate and housing and between the housing and upper electrode support. The seals 18 and 20 form imperforate junctions between the various described members cooperating therewith to permit evacuation of the chamber.

A copper electrode 22 having a coating 24 thereon of a tin-indium alloy is secured to the bottom of the upper electrode support 16 which depends into the chamber 10. The electrode 22 is in electrical contact with the support 16 but is removable therefrom to facilitate coating thereof. The electrode 22 can be attached to the support 16 by means of a stud 26 which is in threaded engagement with a recess in the lower end of the support 16.

A second electrode 28 within the chamber 10 is disposed on and in electrical communication with the base plate 12. The base plate can be of any suitable metal, such as aluminum, and the electrode 28 can be of aluminum. As this electrode need not be removable, the seal between it and the base plate can be accomplished in any conventional manner as by soldering. The upper end of the electrode 28 is substantially horizontal forming a table 30 on which lies a substrate 32 to be coated. In further reference to the electrode 28 it will be designated as the "table electrode" to distinguish it from the upper electrode 22. A glass plate 36 is preferably used to space the substrate 32 from the table electrode 28 to restrict any interaction therebetween.

As operation of the apparatus involves a heating of the various electrodes and parts associated therewith, provision is made to cool these parts. The table electrode 28 is hollow to permit a coolant to be circulated therewithin to not only cool the electrode but also the substrate or crystal 32 and glass plate 36 lying thereon. A portion 38 of the table electrode projects downwardly through an aperture in the base plate 12 forming an outlet 40 for a liquid coolant which is introduced into the electrode through the tube 42. The upper electrode support has a cooling chamber 44 therein through which a liquid coolant is circulated. The coolant is introduced into the support via the tube 46 and exits the cooling chamber via the outlet tube 48.

A direct current power supply 50, which is reversible in polarity, is connected to the base plate through the electrical lead 52 and to the upper electrode support through the electrical lead 54.

Evacuation of the chamber is accomplished by a vacuum pump (not shown) which communicates with the chamber by means of a tube 56 and aperture 58 in the base plate 12. A water trap 60 is provided in the vacuum line 56 between the vacuum pump (not shown) and the chamber 10 to remove moisture from the system.

Means for introducing a selected gas into the chamber is provided through another aperture 62 in the base plate. The selected gas, such as oxygen, can be obtained from a bottle of compressed oxygen gas 64. Accurate control of the introduction of oxygen into the chamber can be obtained through a bleed valve 66. Utilization of a pressure monitor 68 can additionally permit extremely accurate regulation of pressure in the chamber while bleeding in oxygen gas.

A description of the manner in which the apparatus shown in FIGURE 1 is used is also intended to serve as a description of the method of our invention. Before treatment of a semiconductor crystal 32 in the apparatus described above, it may be desirable to perform preliminary operations thereon. In such instance the particular preliminary operations which are to be conducted on the crystal will be dependent upon the nature of the final product being made. These preliminary operations may be material in enhancing the characteristics of a specific product but operability and utility of our invention are not dependent thereon.

By way of example a cadmium sulfide crystal can be cut into the desired configuration in the manner known and accepted in the art. As the cutting or slicing operation frequently involves sawing with a diamond or carbide tipped saw, it may be desirable to lightly lap the surface of the crystal slice to remove saw marks. The lapping can be performed with #600 silicon carbide or silicon boride grit. After the lapping operation the crystal is rinsed in a suitable solvent, such as acetone, dried and placed on the glass plate 36 on the table 30 of the table electrode. It is understood, of course, that other preliminary treatments can be used in addition to or in place of those described above.

The housing 14 and housing supported members 16, 18 and 22 are then placed over the base plate 12 and evacuation of the chamber 10 is commenced. Concurrently circulation of the liquid coolants through the electrode support 16 and the table electrode 28 can be commenced.

The chamber 10 is preferably evacuated by the vacuum pump to a pressure below about 100 microns of mercury. Oxygen is then bled into the chamber until the pressure is raised to almost atmospheric pressure. The chamber is then evacuated once again to a pressure below 100 microns of mercury and oxygen bled into the chamber until the desired pressure obtains. In this manner the chamber is purged of contaminating gases and a substantially pure oxygen atmosphere can be obtained. The chamber can be repeatedly purged in this manner to obtain an even purer oxygen atmosphere. The number of purgings that may be desired, of course, depends upon the pressure to which the chamber is evacuated before the oxygen is introduced. The lower the evacuation pressure the greater the effectiveness of the purging. When the chamber is evacuated to a pressure of below about 10 microns of mercury before the oxygen is bled in, only one purging may be required.

After the chamber has been purged the pressure is adjusted to approximately 100 microns of mercury and a negative potential of approximately 2000 volts to 2500 volts is applied to the table electrode 28. Under these conditions a reverse sputtering of the semiconductor is effected. The potential is maintained for at least two minutes whereupon it is reduced to zero.

The oxygen pressure is then increased to approximately 150 microns by bleeding oxygen into the chamber and then the addition of oxygen is ceased. The polarity of the power supply 50 is then reversed into the normal sputtering arrangement in which the upper electrode 22 forms the cathode. The potential is gradually increased to about 1500 volts while the pressure is concurrently being reduced. After the voltage has reached approximately 1500 volts, oxygen is again bled into the system and the voltage gradually increased to about 2000 volts to 2500 volts. The rate at which voltage is increased is preferably taken in association with changing pressure so as to maintain a current flow of about 30 milliamperes to 40 milliamperes at all times.

Once the potential of approximately 2000 volts to 2500 volts has been attained the oxygen pressure can also be adjusted, if required, to maintain a constant current of approximately 30 milliamperes to 40 milliamperes. The oxygen pressure generally found necessary to obtain this current flow is about 70 microns of mercury to 80 microns of mercury. The system is retained at this voltage and pressure for approximately 75 minutes. Under these conditions the material of the cathode coating 24, the tin-indium alloy, is sputtered into the oxygen atmosphere causing a deposition of a transparent electrically conductive film on the semiconductor surface.

After a film of sufficient thickness has been achieved, the voltage is reduced to zero. Although the film resulting in the above deposition is transparent and has a satisfactory conductivity, its conductivity can be increased even further if it is subjected to the following post treatment.

After the voltage is reduced to zero, as indicated above, the pressure is increased to approximately 150 microns of mercury, again by bleeding in oxygen. At about 150 microns of mercury pressure the polarity of the power supply is reversed and a negative potential of approximately 1500 volts is applied to the table electrode. This potential is maintained for approximately 60 seconds at which time the potential is reduced to zero. The pressure is thereafter increased to atmospheric, the crystal removed from the chamber and cleaned with any of the known solvents, such as toluene and then acetone.

Although the transparent coating can be formed equally well if the semiconductor is placed directly on the table, we prefer to interpose the glass plate therebetween. It has been found that the crystal may exhibit an interaction with the table electrode deleteriously affecting the surface of the crystal in contact therewith. Effective insulation from this interaction has been achieved using a glass plate slightly larger in surface area than the crystal.

As the sputtering treatment causes a temperature increase of the semiconductor crystal it is especially important to provide effective means for removing heat generated therein. Thus, insulating means must not only restrict interaction between the crystal and the table electrode but also function as a means for conducting heat away from the crystal to the water cooled table electrode. Glass has been found to be adequate for both of these purposes. However, in some instances, it may be preferred to apply quartz, recrystallized alumina or mullite.

The faster the rate of sputtering, the higher the temperature to which the semiconductor is raised. The more efficient the cooling of the semiconductor, the lower its temperature for a given rate of sputtering. Thus, more efficient cooling permits one to employ a faster rate of sputtering. Cooling is more efficient if the contact between the table electrode and parts thereon is intimate. To attain a more intimate contact layers 70 and 72 of silicone grease are, respectively, placed between the semiconductor and the glass plate and between the glass plate and the electrode table. We generally prefer to apply the silicone grease to both of two contacting surfaces to insure continuity of the film of grease therebetween. A more effective cooling is thus obtained.

It is a further function of the grease to hold the various components on the table electrode in assembly and it is also believed that the grease additionally inhibits a secondary sputtering between the glass surface and the semiconductor surface which is in contact therewith. Any inert material that has a low vapor pressure and which is sufficiently stable to withstand the sputtering treatment, such as fluorocarbon greases and waxes, might be used in place of the silicone grease.

Although we prefer to clean the semiconductor surface by means of a reverse sputtering treatment befort the transparent ohmic contact is applied, in some instances it may be preferred to chemically etch the semiconductor surface in the normal and accepted manner for such etchings. In such instance, when etching a cadmium sulfide crystal, etching for two minutes in concentrated hydrochloric acid or concentrated nitric acid can be used. Although chemical etchants may be satisfactory for some purposes, it is generally preferred to use the reverse sputtering treatment to clean the semiconductor surface immediately prior to the application of the sputtered transparent coating hereon. Reverse sputtering will effectively clean the surface without presenting the problem of possible concurrent contamination thereof.

The position of the semiconductor in the apparatus is no more material to our invention than it is to usual sputtering practices. By this we mean that a sputtered coating can be formed by locating the semiconductor within the chamber oher than on the table electrode. Although a sputtered coating might be obtained with a semiconductor at another location, thicker coatings are obtained at a faster rate and generally of superior quality when the semiconductor is placed in a direct line between the negative and positive electrodes. Coating metal which is released from the cathode has a greater tendency to be directed toward the anode. Thus, substances placed interjacent the electrodes would come into contact with a greater proportion of the coating metal released from the cathode than in any other location.

The electrodes are spaced in the customary manner and the semiconductor is preferably placed in a line between the electrode closely adjacent the table electrode. This electrode is the positive electrode for sputtering the tin-indium alloy onto the semiconductor. In this manner not only is the semiconductor most susceptible to coming into contact with the greatest proportion of the coating metal but also is sufficiently far enough away from the cathode to have the coating uniformly and coextensively distributed throughout the exposed surface of the semiconductor.

The voltage which is applied during sputtering, in general, must be sufficiently high to obtain sputtering at a satisfactory rate. However, when too high a voltage is employed there may be a deleterious overheating of the substrate when a sputtered coating is being applied to a semiconductor. Thus, the upper limit of potential when coating a heat sensitive substrate is that at which deleterious overheating of the substrate occurs. On the other hand, if the substrate which is being coated is not deletriously affected by such temperature increases, the upper limit of potential during sputtering is that at which sparking would occur between the two electrodes. The reverse sputtering as well as the sputtering to form the transparent coating can be satisfactorily accomplished at a potential of about 2000 volts to 2500 volts when the substrate is a cadmium sulfide crystal. Similarly, the duration of the sputtering will be dependent upon the rate at which the various materials will sputter. The reverse sputtering to clean the crystal need only be about two minutes for cadmium sulfide, cadmium selenide or cadmium telluride. Reverse sputtering to clean semiconductors formed of any of the Group II metals will be generally satisfactory for most purposes if of an equal duration.

The pressure at which the sputtering or reverse sputtering is accomplished is about 50 microns of mercury to 200 microns of mercury. Although a lower pressure can be used, unreasonable lengths of time for cleaning become involved, while a pressure higher than about 200 microns of mercury may entirely prevent the sputtering process from occurring. The preferred pressure used is primarily dependent upon the voltage applied.

Heating of a cadmium sulfide crystal above a temperature of about 400° C. induces disassociation and sublimation of sulfur present therein leaving pure cadmium on the surface of the crystal. Such action affects the photoconducting and luminescing properties of the crystal. With the liberation of free cadmium in the crystal lattice, oxygen can diffuse therein changing the stoichiometry of the crystal decreasing luminescence but increasing sensitivity and absorption in the near infrared.

Before the transparent coating is sputtered onto the crystal it is desired to first reduce the oxygen pressure so as to eliminate outgassing during the sputtering step. For this reason we prefer to reduce the pressure within the chamber to below 100 microns and concurrently increase the negative potential on the upper electrode to about 1500 volts. At this point there is little sputtering but outgassing in the upper regions of the sputtering chamber and upper electrode occurs. During the outgassing there are sporadic increases in pressure and violent surges in deposition rate. The voltage is maintained at approximately 1500 volts until outgassing subsides. The rate at which pressure is decreased and voltage is increased is preferably predetermined to maintain a current of approximately 30 milliamperes to 40 milliamperes.

After outgassing has subsided the system is ready to produce a more satisfactory transparent sputtered coating. At this point the potential is raised to approximately 2000 volts to 2500 volts and oxygen pressure is concurrently increased. The rate of potential and pressure increase is so regulated as to maintain the current at approximately 30 milliamperes to 40 milliamperes. The precise duration of the sputtering treatment depends upon the thickness of the coating which is desired. In general a duration of approximately 75 minutes provides a satisfactory coating thickness.

The precise nature of our coating is somewhat uncertain but it appears to be a reaction product of the indium-tin alloy with the oxygen gas. X-ray and spectrochemical analyses indicate that the film is a mixture of $In_2O_3$ with tin. This is supported by the observation that oxygen pressure decreases during formation of the coating if no oxygen is added to the system. Accordingly, it is generally desirable to concurrently bleed oxygen into the system during the sputtering process to replace the oxygen atoms which are utilized in forming the film.

The film resulting from the oxygen sputtering of the tin-indium alloy possesses excellent transparency and a highly satisfactory degree of conductivity. By "oxygen sputtering" of an alloy we refer to a sputtering process, as described herein, in which the alloy forming the active surface of the negative electrode is sputtered in an oxygen atmosphere. The material deposited in the process is a reaction product of the sputtered alloy and the oxygen. The film resulting in the oxygen sputtering is a highly satisfactory contact on a semiconductor. However, it has been found that the conductivity of the film can even be increased if it is subjected to reverse sputtering treatment for about a minute. It is not certain how the conductance of the film is materially improved by the reverse sputtering treatment but may be a result of additional surface heating and/or oxidation. The reverse sputtering treatment, of course, should be very short compared to the duration of film deposition as reverse sputtering tends to remove film material. A substantial improvement in conductivity has been achieved when a film which has been deposited for 75 minutes is reverse sputtered for only one minute.

It is essential to attaining of a transparent film that the coating used on the upper electrode be of a particular composition. Especially satisfactory results have been obtained using a tin-indium alloy coating having a tin content of approximately 18%. However, satisfactory results have been obtained with tin-indium alloys having from about 10% to 70% tin. An extremely important characteristic of the tin-indium alloy is that it does not combine with the semiconductor to alter the conductivity type thereof but rather forms an intimate ohmic contact therewith. Indium and tin do not adversely affect the conductivity type of an n-type semiconductor such as cadmium sulfide, cadmium selenide and cadmium telluride and, therefore, are extremely advantageous for making an ohmic contact thereon. Semiconductors made from the elements of Group II of the Periodic Table of Elements may also be similarly coated.

It may be desired to also form a second transparent ohmic contact on the crystal. This contact can be formed on the surface 74 of the crystal which was in contact with the glass plate in the previously described method. In such instance the crystal is first coated as described above, cleaned and then reinserted in the chamber in an inverted position. The second transparent coating would then be applied in the same manner as the first.

Figure 2:
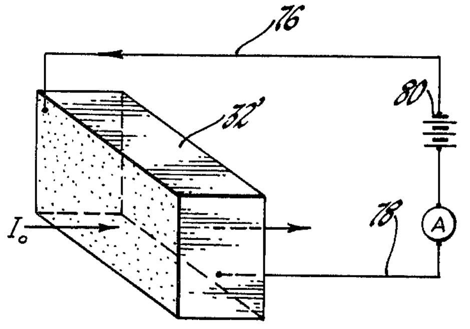
FIGURE 2 is a diagrammatic view showing a semiconductor which is formed in accordance with our invention and which is connected in an electrical circuit in such a manner that the intensity of light impinging thereon regulates the flow of electrons through the electrical circuit.

The resultant article would then have a transparent conductive coating on opposite surfaces of the crystal and can be used in an electrical circuit such as shown in FIGURE 2. Referring now to FIGURE 2, the crystal 32' has electrical leads 76 and 78 from a power source 80 respectively attached to each of these contacts inducing an electrical potential therebetween. The amount of current passing between the two contacts can be regulated by the intensity of light, $I_0$, impinging on the crystal. A plurality of such devices can be arranged adjacent one another so that radiation successively passes through one such semiconductor into the other. In this manner more efficient use of radiation of a given intensity is obtained.

Figure 3:
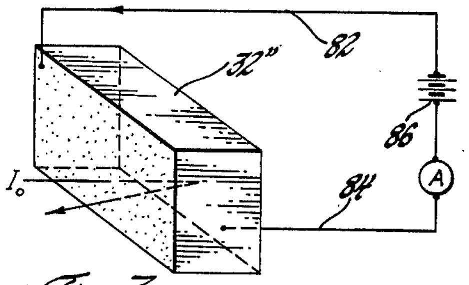
FIGURE 3 is another diagrammatic view showing a modification of the invention shown in FIGURE 2.

In some instances it may be desired to use a reflective contact in combination with a transparent contact. The transparent contact, of course, can be applied in the manner hereinbefore described. The reflective coating would be formed on the surface 74 of the crystal opposite to that having a transparent coating thereon. The manner in which the reflective coating is applied forms no part of this invention and may be accomplished in any suitable manner. For example, the reflective coating can be formed by electrodeposition in the manner described in the copending United States patent application Serial No. 677,914, Boyd et al., filed August 13, 1957, and which is owned by the assignee of the present invention. The reflective coating may also be applied by evaporation techniques which are well known in the art. The resultant article is shown in FIGURE 3 where electrical leads 82 and 84 from a power source 86 are respectively connected to the transparent coating and the reflective coating inducing an electrical potential therebetween. The amount of current flow through the semiconductor 32" can then be regulated by the intensity of radiation impinging on the semiconductor. In this embodiment of the invention the amount of current flow is substantially increased over that obtained with the embodiment shown in FIGURE 2 since light, $I_0$, impinging on the crystal through the transparent coating passes through the crystal, strikes the reflective contact and is reflected back through the crystal. Thus, a double effect is obtained.

Although the invention has been described in connection with certain specific examples thereof, no limitation is intended thereby except as defined in the appended claims.

We claim:

1. A method for the production of thin films which comprises the following steps: placing a substrate in a closed chamber, providing a low pressure oxygen atmosphere within said chamber, providing in said chamber a first electrode having an active surface thereon which is formed of a tin-indium alloy containing about 10% to 70%, by weight, tin and the balance substantially indium, providing a second electrode within said chamber, applying a negative potential to said second electrode so as to clean said substrate by reverse sputtering, and applying a negative potential to said first electrode, said potential on said first electrode being sufficient in degree and duration at said pressure to sputter said tin-indium alloy into said oxygen atmosphere causing a deposition of a transparent electrically conductive film on said substrate material.

2. A method for the production of thin films which comprises the following steps: placing a substrate in a closed chamber, providing a low pressure oxygen atmosphere within said chamber, providing in said chamber a first electrode having an active surface thereon which is formed of a tin-indium alloy, containing about 10% to 70%, by weight, tin and the balance substantially indium, providing a second electrode within said chamber, applying a negative potential to said second electrode so as to clean said substrate by reverse sputtering, applying a negative potential to said first electrode, said potential on said first electrode being sufficient in degree and duration at said pressure to sputter said tin-indium alloy into said oxygen atmosphere causing a deposition of a transparent electrically conductive film on said substrate material, reapplying said negative potential to said second electrode for a substantially lesser duration than that at which said film is deposited so as to improve electrical conductivity of said film and cooling said substrate during application of said negative potentials.

3. The method for the production of thin films which comprises the following steps: providing in a closed chamber a first electrode having an active surface which is formed of a tin-indium alloy containing about 10% to 70%, by weight, tin and the balance substantially indium, providing a second electrode in said chamber, placing a radiation sensitive semiconductor selected from the group consisting of cadmium sulfide, cadmium selenide and cadmium telluride in said chamber adjacent said second electrode, providing a low pressure oxygen atmosphere within said chamber, applying a negative potential to said second electrode so as to clean said semiconductor by reverse sputtering, at an oxygen pressure of approximately 50 millimeters of mercury to 200 millimeters of mercury applying to said first electrode a negative potential of approximately 2000 volts to 2500 volts, said potential being of a sufficient duration to sputter said tin-indium alloy into said oxygen atmosphere causing a deposition of a transparent electrically conductive film on said semiconductor, reapplying said negative potential to said second electrode at a low oxygen pressure for a substantially lesser duration than that at which said film is deposited so as to improve electrical conductivity of said film and cooling said substrate during application of said negative potentials.

4. A method for the production of thin films which comprises the following steps: in a closed chamber providing a first electrode having an active surface which is formed of a tin-indium alloy containing about 10% to 70%, by weight, tin and the balance substantially indium, providing a second electrode, placing a radiation sensitive semiconductor from the group consisting of cadmium sulfide, cadmium selenide and cadmium telluride in said chamber adjacent said second electrode, applying a negative potential to said second electrode so as to clean said semiconductor by reverse sputtering, providing within said chamber an oxygen atmosphere at a pressure of about 50 millimeters of mercury to 200 millimeters of mercury, and applying a negative potential of about 2000 volts to 2500 volts to said first electrode so as to deposit a transparent conductive film on said semiconductor.

References Cited by the Examiner

UNITED STATES PATENTS

| | | | |
|---|---|---|---|
| 2,465,713 | 3/1949 | Dimmick | 117—93.3 |
| 2,636,855 | 4/1953 | Schwarz | 204—192 |

(Other references on following page)

UNITED STATES PATENTS

| | | | |
|---|---|---|---|
| 2,766,144 | 10/1956 | Lidow | 338—15 |
| 2,769,778 | 11/1956 | Preston | 204—192 |
| 2,937,353 | 5/1960 | Wasserman | 338—15 |
| 3,021,271 | 2/1963 | Wehner | 204—192 |

FOREIGN PATENTS

| | | |
|---|---|---|
| 542,599 | 1/1942 | Great Britain. |
| 830,392 | 3/1960 | Great Britain. |

OTHER REFERENCES

Holland: Vacuum Deposition of Thin Flms, pp. 491–498, 1956.

WINSTON A. DOUGLAS, *Primary Examiner.*

JOHN H. MACK, *Examiner.*